US008214395B2

(12) United States Patent
Stevens et al.

(10) Patent No.: US 8,214,395 B2
(45) Date of Patent: Jul. 3, 2012

(54) TRACKING AND EDITING A RESOURCE IN A REAL-TIME COLLABORATIVE SESSION

(75) Inventors: Jeremy Max Stevens, Seattle, WA (US); Kanchan Mitra, Woodinville, WA (US); Kyle Krum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 11/379,687

(22) Filed: Apr. 21, 2006

(65) Prior Publication Data

US 2007/0250506 A1    Oct. 25, 2007

(51) Int. Cl.
*G06F 7/00* (2006.01)
*G06F 15/16* (2006.01)
*G06F 17/00* (2006.01)
*G06F 3/00* (2006.01)

(52) U.S. Cl. ........ 707/783; 707/608; 707/784; 709/205; 715/255; 715/751

(58) Field of Classification Search .................. 707/608, 707/783, 784; 709/205; 715/255, 751
See application file for complete search history.

(56) References Cited

U.S. PATENT DOCUMENTS

| | | | | |
|---|---|---|---|---|
| 5,220,657 A * | 6/1993 | Bly et al. | ...................... | 711/152 |
| 5,392,400 A | 2/1995 | Berkowitz et al. | | |
| 6,158,903 A | 12/2000 | Schaeffer et al. | | |
| 6,266,683 B1 | 7/2001 | Yehuda et al. | | |
| 6,342,906 B1 | 1/2002 | Kumar et al. | | |
| 6,363,352 B1 * | 3/2002 | Dailey et al. | ...................... | 705/9 |
| 6,570,590 B1 * | 5/2003 | Dubrow et al. | ............... | 715/751 |
| 6,584,493 B1 * | 6/2003 | Butler | ........................... | 709/204 |
| 6,629,129 B1 * | 9/2003 | Bookspan et al. | ............ | 709/204 |
| 6,636,888 B1 * | 10/2003 | Bookspan et al. | ............ | 709/203 |
| 6,654,032 B1 * | 11/2003 | Zhu et al. | ....................... | 715/753 |
| 6,711,718 B2 | 3/2004 | Pfeil et al. | | |
| 6,934,740 B1 | 8/2005 | Lawande et al. | | |
| 7,072,893 B1 * | 7/2006 | Rehfeld et al. | .................... | 707/8 |
| 7,167,182 B2 * | 1/2007 | Butler | ........................... | 345/537 |

(Continued)

FOREIGN PATENT DOCUMENTS

WO    WO00/62220    10/2000

(Continued)

OTHER PUBLICATIONS

University of Missouri, How to use Netmeeting, University of Missouri, Nov. 4, 2004, pp. 1-5.*

(Continued)

*Primary Examiner* — Rehana Perveen
*Assistant Examiner* — Huen Wong
(74) *Attorney, Agent, or Firm* — Perkins Coie LLP

(57) ABSTRACT

A method and system for tracking and editing a resource in a real-time collaborative session is provided. A collaboration system provides real-time collaborative sessions between participants. When a participant in a collaboration session uploads a non-editable copy of a resource for viewing in the collaborative session, the collaboration system records the participant who uploaded the non-editable copy of the resource as the owner of an original copy of the resource and the location of the resource on that participant's machine. When the same or another participant attempts to edit the non-editable copy of the resource during the collaborative session, the collaboration system locates the original copy of the resource and starts the sharing of the resource in an editable form in the collaborative session.

20 Claims, 5 Drawing Sheets

U.S. PATENT DOCUMENTS

| | | | |
|---|---|---|---|
| 7,496,841 B2 * | 2/2009 | Hadfield et al. | 715/255 |
| 7,818,678 B2 * | 10/2010 | Massand | 715/751 |
| 7,962,853 B2 * | 6/2011 | Bedi et al. | 715/751 |
| 2002/0180726 A1 | 12/2002 | Shi et al. | |
| 2003/0105816 A1 * | 6/2003 | Goswami | 709/204 |
| 2003/0182375 A1 | 9/2003 | Zhu et al. | |
| 2004/0122897 A1 * | 6/2004 | Seelemann et al. | 709/204 |
| 2004/0158586 A1 * | 8/2004 | Tsai | 707/200 |
| 2004/0162833 A1 * | 8/2004 | Jones et al. | 707/100 |
| 2004/0163086 A1 * | 8/2004 | Friedman et al. | 719/310 |
| 2004/0167983 A1 * | 8/2004 | Friedman et al. | 709/227 |
| 2004/0181579 A1 * | 9/2004 | Huck et al. | 709/205 |
| 2005/0010874 A1 | 1/2005 | Moder et al. | |
| 2005/0039116 A1 | 2/2005 | Slack-Smith | |
| 2005/0055333 A1 * | 3/2005 | Deen et al. | 707/1 |
| 2005/0060382 A1 | 3/2005 | Spector et al. | |
| 2005/0064858 A1 | 3/2005 | Makela et al. | |
| 2005/0165859 A1 | 7/2005 | Geyer et al. | |
| 2005/0193062 A1 * | 9/2005 | Komine et al. | 709/204 |
| 2005/0289354 A1 * | 12/2005 | Borthakur et al. | 713/182 |
| 2006/0026502 A1 * | 2/2006 | Dutta | 715/511 |
| 2006/0200755 A1 | 9/2006 | Melmon et al. | |
| 2010/0070580 A1 * | 3/2010 | Williams et al. | 709/205 |

FOREIGN PATENT DOCUMENTS

WO   WO2005/008415   1/2005

OTHER PUBLICATIONS

Robert Heuer, Microsoft Office LiveMeeting 2005 Step by Step, Apr. 12, 2005, Microsoft Press.*

International Search Report for International Patent Application No. PCT/US2007/002318, Microsoft Corporation, Jul. 5, 2007 (3 pages).

Chen, David and Sun, Chengzheng, "A Distributed Algorithm for Graphic Objects Replication in real-Time Group Editors," Proc. of ACM International Conference on Supporting Group Work, Nov. 14-17, 1999.

Sakata, S., and Ueda, T., "Real-Time Desktop Conference System Based on Integrated Group Communication Protocols," IEEE Xplore, Computers and Communications, 1998 Conference Proceedings, Mar. 16-18, 1988.

"Introducing ECP Connect: True Enterprise Conferencing," Interwise Communication [Accessed Sep. 27, 2005] http://www.interwise.com/product/6modes.html.

Ohmori T., et al., "Distributed Cooperative Control for Sharing Applications Based on Multiparty Desktop Conferencing System," Distributed Computing Systems 1992, Proceedings of the 12th International Conference, Jun. 9-12, 1992.

Greif, Irene and Sarin, Sunil, "Data Sharing in Group Work," ACM Transactions on Office Information Systems, vol. 5, No. 2, Apr. 1987.

Supplementary European Search Report, Application No. 07717088.4-2221, Feb. 3, 2011, 7 pages.

Dridi, F. and Neumann, G., "How to Implement Web-Based Groupware Systems based on WebDAV," IEEE 8th Int'l Workshops on Enabling Technologies: Infrastructure for Collaborative Enterprises, Jan. 1, 1999 (Oct. 10, 1999), XP-002620177 [http://citeseerx.1st.psu.edu/viewdoc/summary?doi=10.1.1.44.664] last accessed Feb. 3, 2011.

* cited by examiner

TRACKING AND EDITING A RESOURCE IN A REAL-TIME COLLABORATIVE SESSION

BACKGROUND

With the proliferation of computers and the advent of the Internet, and in particular, the maturing of the World Wide Web ("web"), real-time conversations between conversation participants via their computer systems are becoming increasingly common. These conversations, which take place virtually over computer networks, are ever replacing the traditional face-to-face meetings.

Collaboration systems, such as MICROSOFT LIVE MEETING, are increasingly being used to conduct these virtual meetings between potentially geographically distributed people. In a typical scenario, a meeting organizer schedules a virtual meeting with a collaboration service server, and provides a list of people who are expected to participate in the scheduled virtual meeting. The meeting organizer then sends each of the expected participants an invitation inviting the participant to attend the virtual meeting at the scheduled time.

These collaboration systems allow for the sharing of resources during a virtual meeting. For example, a meeting participant can share documents by uploading copies of the documents into the meeting. While the meeting participants are able to view the shared documents, a difficulty arises when a meeting participant tries to make an edit to the shared document. Because only a copy of the document was loaded into the meeting, any changes to the shared document are only made to the copy of the document and not reflected in the original copy of the document.

SUMMARY

A method and system for tracking and editing a resource in a real-time collaborative session is provided. A collaboration system provides real-time collaborative sessions between participants. When a participant in a collaboration session uploads a non-editable copy of a resource for viewing in the collaborative session, the collaboration system records the participant who uploaded the non-editable copy of the resource as the owner of an original copy of the resource, as well as the location of the resource on that participant's machine. When the same or another participant attempts to edit the non-editable copy of the resource during the collaborative session, the collaboration system locates the original copy of the resource and starts the sharing of the resource in an editable form in the collaborative session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
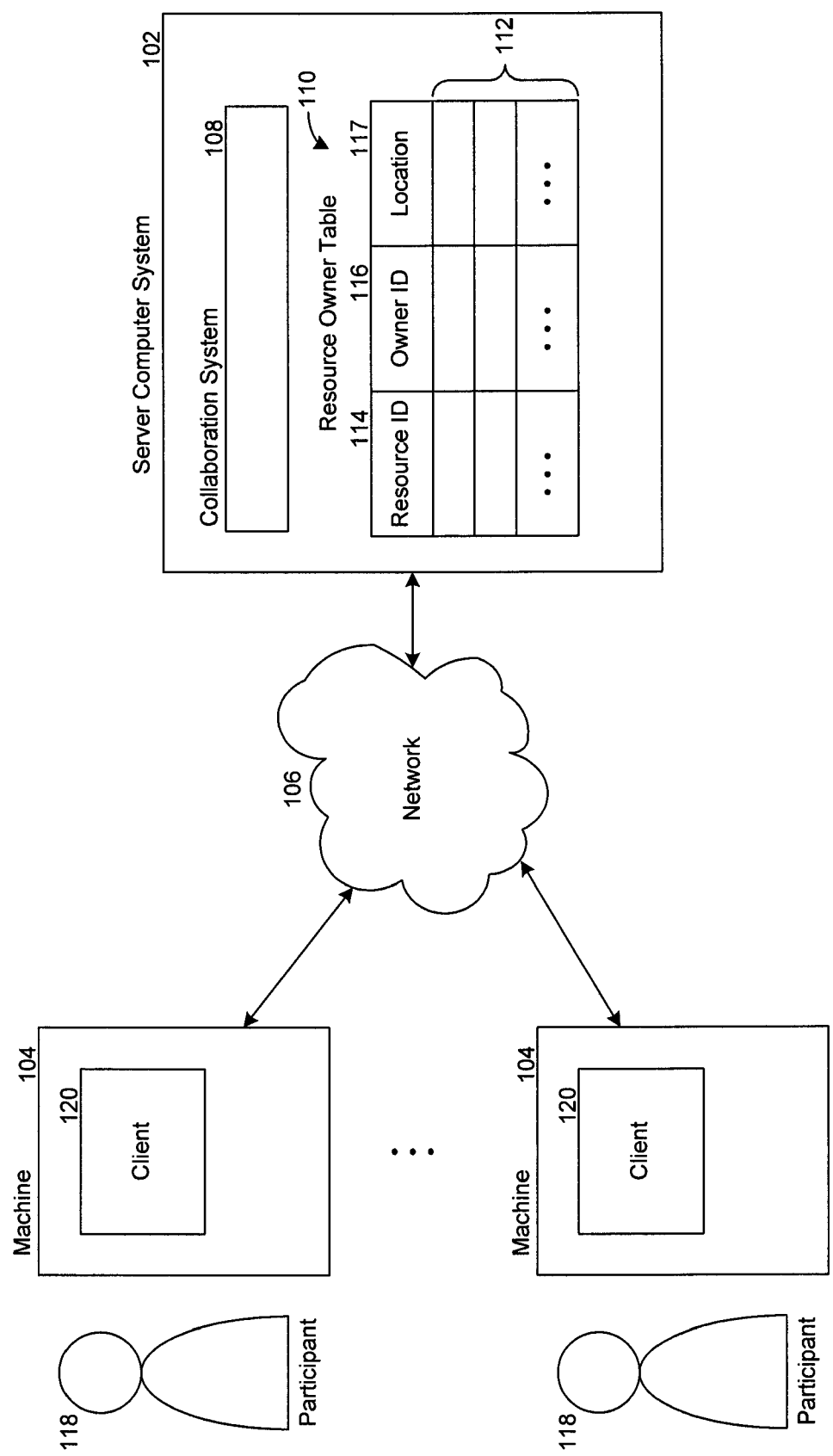
FIG. 1 is a high-level block diagram illustrating an example environment in which a collaboration system may operate.

A method and system for tracking and editing a resource in a real-time collaborative session is provided. In some embodiments, a collaboration system allows for the creation of virtual collaborative sessions or conferences (interchangeably referred to herein as "virtual meetings" or "meetings") and the editing of copies of resources that have been loaded into the meetings by tracking the location of the originals of the resources. When a participant in a meeting uploads a non-editable copy of a resource, such as, by way of example, a document, a file, an image, etc., into the meeting for viewing during the meeting, the collaboration system records the meeting participant who uploaded the non-editable copy of the resource as the owner of an original copy of the resource. The collaboration system also records the location (e.g., computer name+full path) from where the resource was uploaded. Subsequently, when a meeting participant attempts to edit the non-editable copy of the resource during the meeting, the collaboration system locates the original copy of the resource and starts the sharing of the resource in an editable form in the collaborative session. The collaboration system can use the recorded indication of the owner of the original copy of the resource, and location of the resource on that computer, to locate the original copy of the resource.

In some embodiments, prior to sharing the editable copy of the resource for editing, the collaboration system can ask the owner of the original copy of the resource for authorization to share the resource for editing. The collaboration system can also ask whether the owner authorizes the meeting participant who attempted to edit the non-editable copy of the resource to be given control of the editable copy of the resource for editing. For example, the collaboration system may cause the client application that is running on the owner's computer system (interchangeably referred to herein as a "machine") to display a dialog box, or a series of dialog boxes, which displays the information regarding the request to share the resource for editing, and through which the owner can respond to the presented questions.

If the owner authorizes both the sharing of the resource for editing and the granting of the control of the editable copy of the resource to the meeting participant who attempted to edit the non-editable copy of the resource, the collaboration system causes the resource to be shared in an editable form and gives control of the resource for editing to the meeting participant who attempted to edit the non-editable copy of the resource. For example, the collaboration system can cause the client application running on the owner's machine to initiate application sharing of the resource. Application sharing of the resource causes the original copy of the resource to be loaded into the meeting in an editable form, thus allowing for edits to be made to the original copy of the resource.

If the owner authorizes the sharing of the resource for editing, but does not authorize control of the editable copy of the resource to be given to the meeting participant who attempted to edit the non-editable copy of the resource, the collaboration system causes the resource to be uploaded into the meeting in an editable form, and gives control of the editable copy of the resource to the owner. In this instance, the owner retains control of the editable copy of the resource even though another meeting participant first attempted to edit the non-editable copy of the resource. Finally, if the owner does not authorize the sharing of the resource for editing, the collaboration system informs the meeting participant who attempted to edit the copy of the resource of the owner's refusal to share the resource for editing.

In some embodiments, the collaboration system may also identify the location of the original copy of the resource on the owner's machine, and verify that the original copy of the resource is located at the identified location. For example, the collaboration system may try to verify that the original copy of the resource is located at the identified location prior to asking the owner whether the owner wants to share the resource for editing. The collaboration system may use any of a variety of well-known remote procedure call or remote command techniques to verify that the original copy of the resource is located at the identified location. If the collaboration system is not able to verify the location of the original copy of the resource, the collaboration system may ask the owner to provide a current location of the original copy of the resource. In some embodiments, the collaboration system may also ask the owner whether the owner wants to share another resource for editing. If the owner provides a current location of the original copy of the resource, the collaboration system may continue by asking whether the owner authorizes the meeting participant who attempted to edit the non-editable copy of the resource to be given control of the editable copy of the resource for editing. If the owner indicates that another resource is to be shared for editing, the collaboration system can cause the owner's machine to open a dialog through which the owner can specify the new resource that is to be shared for editing. If the owner fails to either provide a current location of the original copy of the resource or indicate that a new resource is to be shared for editing, the collaboration system treats this situation as the owner not authorizing the sharing of the resource for editing. In this instance, the collaboration system informs the meeting participant who tried to edit the copy of the resource of the owner's refusal to share the resource for editing.

FIG. 1 is a high-level block diagram illustrating an example environment in which a collaboration system may operate. The environment is only one example of a suitable operating environment and is not intended to suggest any limitation as to the scope of use or functionality of the collaboration system as described herein. As depicted, the environment comprises a server computer system 102 and a plurality of machines 104, each coupled to a network 106. The server computer system comprises a collaboration system 108 and a resource owner table 110. The collaboration system executes on the server, and provides collaboration services by "hosting" one or more meetings. The collaboration system utilizes the resource owner table to maintain a record of the non-editable copies of the resources that are uploaded into the meetings and the location of the originals of these uploaded resources. The resource owner table comprises resource records 112, and each resource record is shown comprising, by way of example, three fields including a resource ID field 114, an owner ID field 116, and a location field 117. The contents of the resource ID field identify a resource that was uploaded into a meeting in a non-editable form. The contents of the owner ID field identify a meeting participant who originally uploaded the non-editable copy of the resource into the meeting. The contents of the location field specify the location of the original of the resource on the uploading meeting participant's machine.

As depicted in FIG. 1, the collaboration system may be providing the conferencing services to meeting participants 118. Each participant may execute a client application 120 on his or her machine to access the collaboration system and participate in a meeting or multiple meetings. The clients executing on the machines enable the participants at the machines to interact with the collaboration system. Only one server computer system is shown in FIG. 1 for simplicity and one skilled in the art will appreciate that the collaboration system and/or the resource owner table may be distributed over multiple server computer systems.

In general terms, the network is a communications link that facilitates the transfer of electronic content between, for example, the attached server computer system and the plurality of machines. In some embodiments, the network includes the Internet. It will be appreciated that the network may be comprised of one or more other types of networks, such as a local area network, a wide area network, a point-to-point dial-up connection, a wireless network, and the like.

The computing device on which the collaboration system is implemented, including the server computer system and the machines, may include a central processing unit, memory, input devices (e.g., keyboard and pointing devices), output devices (e.g., display devices), and storage devices (e.g., disk drives). The memory and storage devices are computer-readable media that may contain instructions that implement the collaboration system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the collaboration system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The collaboration system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
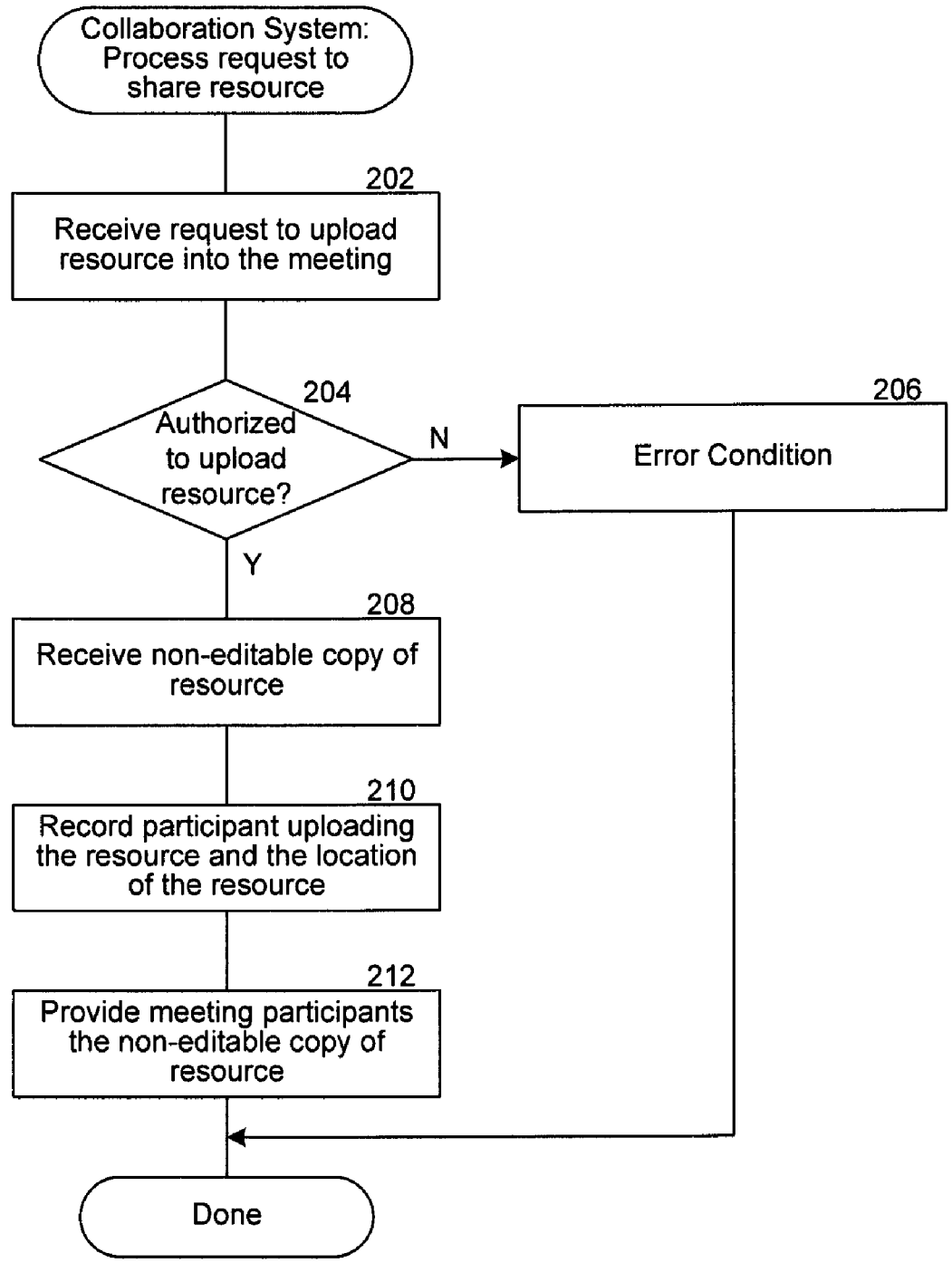
FIG. 2 is a flow diagram that illustrates the collaboration system processing a request to share a resource, according to some embodiments.

FIG. 2 is a flow diagram that illustrates a collaboration system processing a request to share a resource, according to some embodiments. By way of example, the collaboration system may be hosting a meeting that is being attended by several participants. In block 202, the collaboration system receives a request from one of the meeting participants to upload a resource to be shared in the meeting. In block 204, the collaboration system checks to determine whether the meeting participant who made the request is authorized to upload resources into the meeting. For example, the collaboration system may provide for multiple classes of participants based on the level of permissions, such as "presenters" and "attendees," with presenters having permission to perform additional or more functionality during the meeting than attendees. If the collaboration system determines that the meeting participant who made the request is not authorized to upload resources into the meeting, then, in block 206, the collaboration system reports the error condition. For example, the collaboration system may only allow presenters or other participants with sufficient permissions in the meeting to upload resources, and the meeting participant who made the request may have been an attendee without the requisite level of permissions to upload resources into the meeting. In this instance, the collaboration system may log the failed request to upload the resource into the meeting in an error log. The collaboration system may also provide each of the meeting participants a notification of the failed attempt to upload the resource into the meeting by the particular meeting participant who made the request.

If, in block 204, the collaboration system determines that the meeting participant who made the request is authorized to upload resources into the meeting, then, in block 208, the collaboration system receives from the meeting participant's machine a non-editable copy of the resource. For example, the collaboration system may instruct the client application executing on the meeting participant's machine to initiate displaying of the resource in a non-editable form. In response, the client application on the meeting participant's machine may generate a non-editable copy of the resource and initiate displaying of the non-editable copy of the resource by uploading it into the meeting. By way of example, the client application may generate a copy of the resource in MICROSOFT Office Document Imaging (MODI) format or any of a variety of other well-known non-editable formats to produce a non-editable form of the resource.

In block 210, the collaboration system creates a record of the meeting participant who uploaded the non-editable copy of the resource into the meeting. For example, the collaboration system can create a record in the resource owner table, and identify the non-editable copy of the resource in the resource ID field, indicate the identity of the meeting participant's machine (e.g., computer name, IP address of the machine, etc.) in the owner ID field, and indicate the location of the resource on that meeting participant's machine in the location field. By creating the record in the resource owner table, the collaboration system is able to track the meeting participant who uploaded the non-editable copy of the resource into the meeting, as well as the location of the original copy of the resource uploaded into the meeting in the non-editable form. In block 212, the collaboration system provides the non-editable copy of the resource to each of the meeting participants' machines.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 3A:
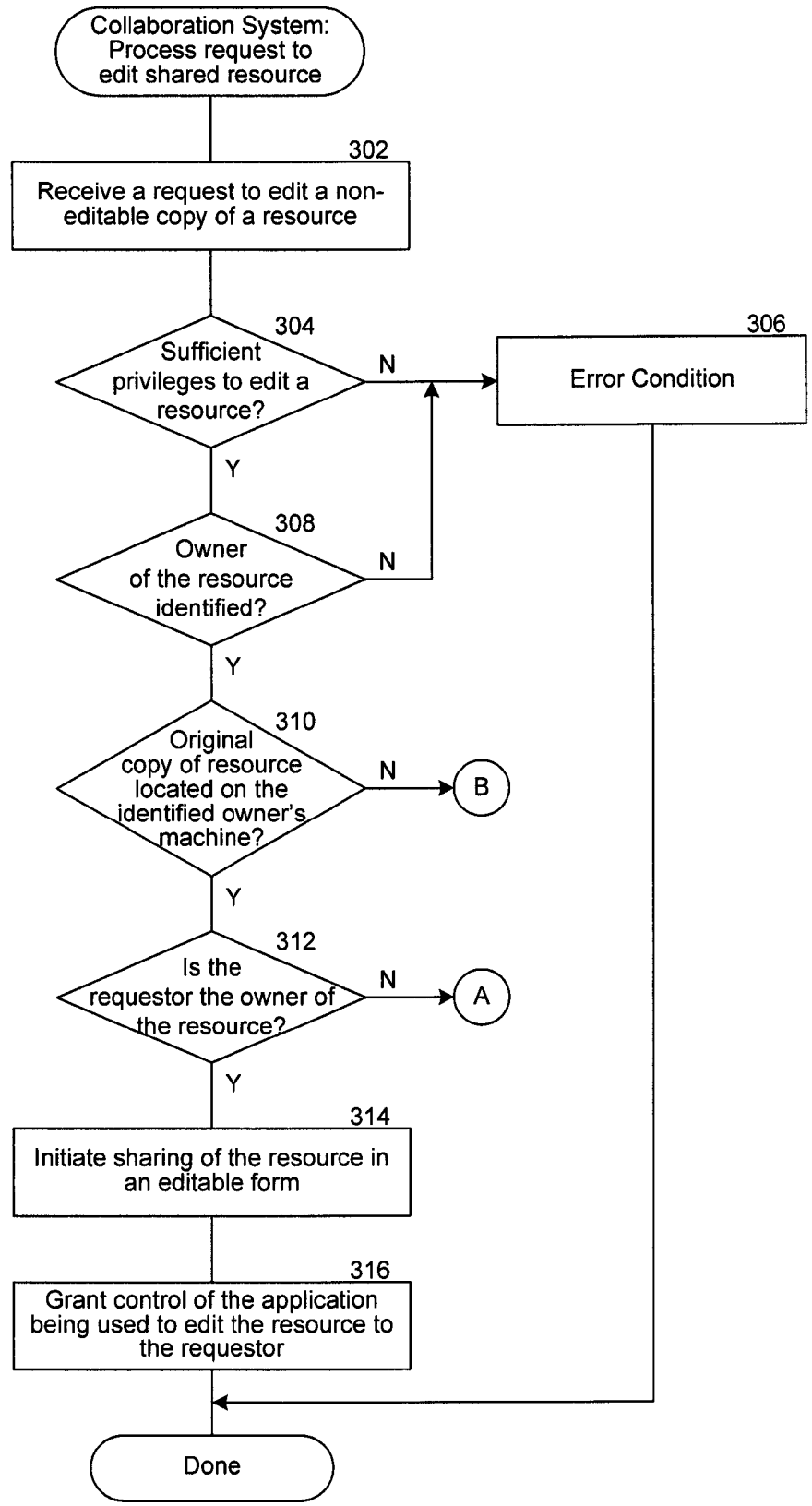
FIGS. 3A-C are flow diagrams that illustrate the collaboration system processing a request to edit a shared resource, according to some embodiments.
Figure 3B:
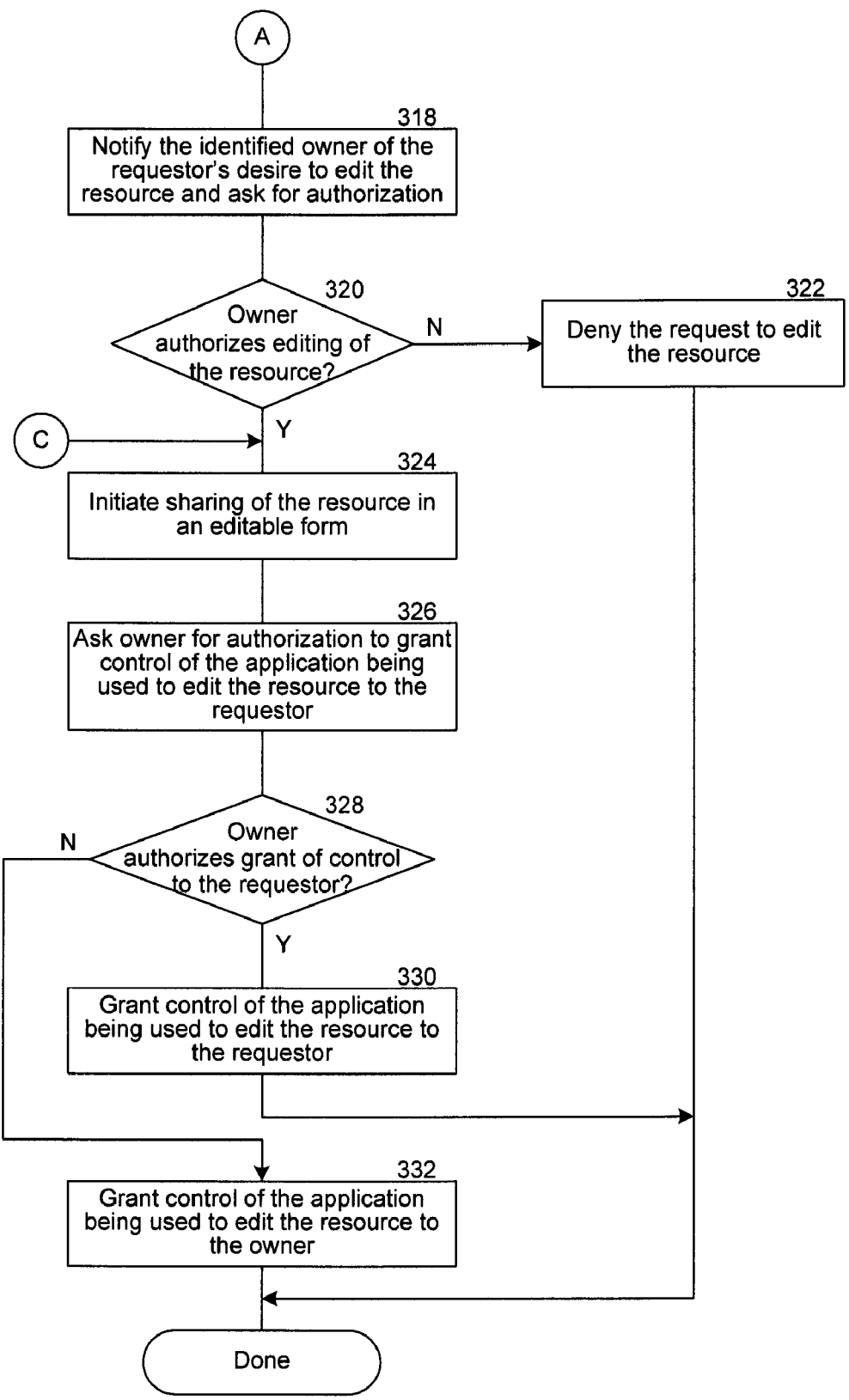
Figure 3C:
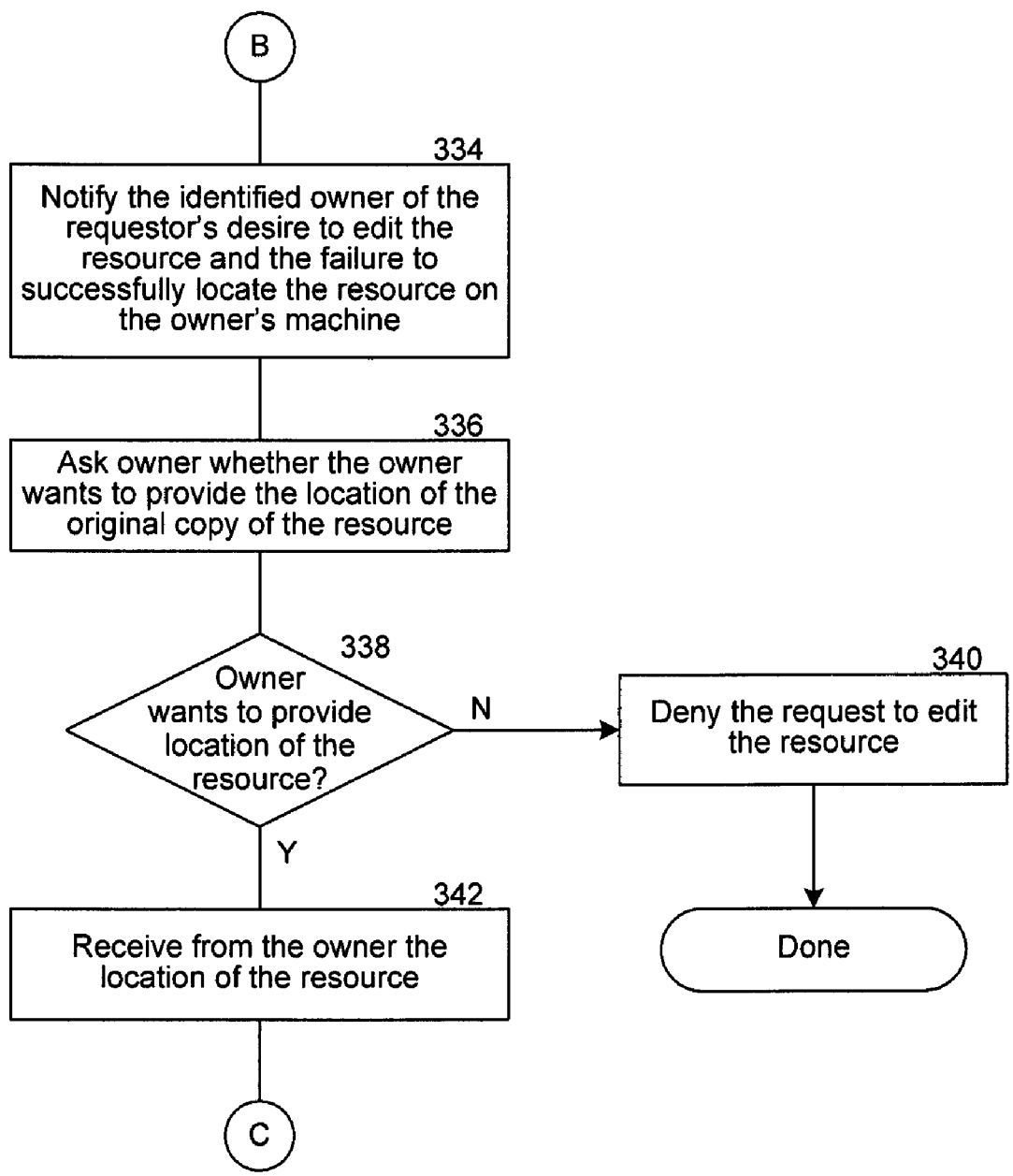

FIGS. 3A-C are flow diagrams that illustrate the collaboration system processing a request to edit a shared resource, according to some embodiments. In block 302, the collaboration system receives a request to edit a non-editable copy of a resource that is being shared in a meeting. By way of example, a presenter in the meeting may be viewing an image of the non-editable copy of the resource, such as a document, which was previously uploaded into the meeting and feel it necessary to edit this resource. The meeting presenter may invoke a command, for example, on a user interface of the client application executing on the presenter's machine, to edit the resource. In response, the client application can send the request to the collaboration system. In block 304, the collaboration system checks to determine whether the requestor (i.e., the meeting participant who requested to edit the resource) has sufficient privileges to edit the resource. For example, the collaboration system may only allow presenters in the meeting to edit the resources that are being shared in the meeting. If the collaboration system determines that the requestor does not have sufficient privileges to edit the resource, then, in block 306, the collaboration system reports the error condition. For example, the collaboration system may inform the requester of the denial of the request due to lack of sufficient privileges. The collaboration system may also provide the presenters in the meeting a notification of the failed attempt to edit the resource.

If, in block 304, the collaboration system determines that the requester does have sufficient privileges to edit the resource, then, in block 308, the collaboration system checks to determine if it can identify the owner of the resource. The owner of the resource is the meeting participant who uploaded the non-editable copy of the resource to be displayed or viewed in the meeting. In some embodiments, the collaboration system can determine the identity of the owner of the resource from the resource owner table. If the collaboration system cannot identify the owner of the resource, then, in block 306, the collaboration system reports the error condition. For example, the collaboration system can inform the requester of the denial of the request because of its inability to identify the owner of the resource.

If, in block 308, the collaboration system is able to identify the owner of the resource, then, in block 310, the collaboration system checks to determine whether the original copy of the resource is located on the identified owner's machine. By performing the check of the identified owner's machine, the collaboration system can verify the location of the original copy of the resource. The collaboration system may use any of a variety of well-known procedure call/communication techniques to check the identified owner's machine for the existence of the original copy of the resource. If the collaboration system determines that the original copy of the resource is located on the identified owner's machine, then, in block 312, the collaboration system checks to determine whether the requestor is also the owner of the resource. If the collaboration system determines that the requester is the owner of the resource, then, in block 314, the collaboration system initiates sharing of the resource in an editable form. For example, the collaboration system may instruct the client application executing on the owner's machine to initiate application sharing of the resource on the owner's machine. In response, the client application on the owner's machine may initiate sharing of the editable copy of the resource in the meeting. Subsequent to initiating the sharing of the resource in an editable form, in block 316, the collaboration system grants control of the application that is being used to edit the resource to the requester, who, in this instance, happens to be the owner of the resource. This allows the requester to edit the resource.

If, in block 312, the collaboration system determines that the requestor is not the owner of the resource, then, in block 318, the collaboration system notifies the identified owner of the requestor's desire to edit the resource, and asks the owner for authorization to allow editing of the resource in the meeting. For example, the collaboration system may instruct the client application executing on the owner's machine to initiate a dialog (e.g., an interactive menu, user interface, etc.) informing the owner of the requestor's desire to edit the resource. The client application on the owner's machine can also use the dialog to ask the owner for authorization to allow editing of the resource in the meeting. The owner can view the information displayed by the client application and appropriately respond to the questions through the dialog. In block 320, the collaboration system checks to determine whether the owner of the resource authorizes the editing of the resource. If the collaboration system determines that the owner does not authorize the editing of the resource, then, in block 322, the collaboration system denies the request to edit the resource. The collaboration system may inform the requestor of the resource owner's refusal to allow editing of the resource.

If, in block 320, the collaboration system determines that the owner authorizes the editing of the resource, then, in block 324, the collaboration system initiates sharing of the resource in an editable form. In block 326, the collaboration system asks the owner for authorization to grant control of the application that is being used to edit the resource to the requester. For example, the client application on the owner's machine can request authorization to grant control of the application that is being used to edit the resource to the requestor. In block 328, the collaboration system checks to determine whether the owner of the resource authorizes the granting of the control to the requester. If the collaboration system determines that the owner authorizes granting of the control to the requester, then, in block 330, the collaboration system grants control of the application that is being used to edit the resource to the requester. This allows the requester to edit the resource. Otherwise, if the collaboration system determines that the owner does not authorize the granting of control to the requester, then, in block 332, the collaboration system grants control of the application that is being used to edit the resource to the owner. This allows the owner to retain control of the resource.

If, in block 310, the collaboration system determines that the original copy of the resource is not located on the identified owner's machine, then, in block 334, the collaboration system notifies the identified owner of the requestor's desire to edit the resource, and the failure to successfully locate the original copy of the resource on the owner's machine. For example, the owner may have rejoined the meeting using a different machine since the time the owner initially uploaded the non-editable copy of the resource for sharing in the meeting. In block 336, the collaboration system asks whether the owner wants to provide the location of the original copy of the resource. In block 338, the collaboration system checks to determine whether the owner wants to provide the new location of the original copy of the resource. If the collaboration system determines that the owner does not want to provide the new location of the original copy of the resource, then, in block 340, the collaboration system denies the request to edit the resource. The collaboration system may inform the requestor of the failure to locate the original copy of the resource and resource owner's refusal to provide the new location of the original copy of the resource.

If the collaboration system determines that the owner wants to provide the new location of the original copy of the resource, then, in block 342, the collaboration system receives from the owner the new location of the original copy of the resource. The collaboration system then continues processing at block 324. For example, in block 324, the collaboration system causes the resource to be shared in an editable form in the meeting. The collaboration system can then ask the owner for authorization to grant control of the application that is being used edit the resource to the requester (block 326) and, depending on the owner's response, grant control of the application to the requestor (block 330) or grant control of the application to the owner (block 332).

In some embodiments, upon determining that the owner does not want to provide the new location of the original copy of the resource (block 338), the collaboration system may inquire as to whether the owner wants to start sharing another resource for editing in the meeting. In the instance where the owner desires to start sharing another resource for editing in the meeting, the collaboration system can receive (e.g., upload) from the owner's machine an editable copy of a new resource, and grant control of the editable copy of the new resource for editing to the owner.

Although the subject matter has been described in language specific to structural features and/or methodological acts, it is to be understood that the subject matter defined in the appended claims is not necessarily limited to the specific features or acts described above. Accordingly, the scope of the invention is solely defined by the appended claims, and the specific features and acts described above are disclosed as example forms of implementing the claims.

We claim:

1. A method in a collaboration system for tracking a non-editable copy of a resource in a real-time collaborative session, the method comprising:
   creating the real-time collaborative session, the real-time collaborative session having participants;
   receiving from an owner of an original copy of the resource the non-editable copy of the resource that cannot be edited during the real-time collaborative session for viewing in the real-time collaborative session, the owner being a participant of the real-time collaborative session;
   recording a location of the original copy of the resource, the location associated with the owner of the original copy of the resource;
   sharing the non-editable copy of the resource during the real-time collaborative session so that the participants can view but not edit the non-editable copy of the resource as part of the real-time collaborative session;
   receiving from a requestor who is a participant of the real-time collaborative session a request to edit the original copy of the resource while the non-editable copy of the resource is being shared;
   determining whether the requestor has permission to edit the original copy of the resource;
   when it is determined that the requestor has permission to edit the original copy of the resource,
      when the requestor is owner of the original copy of the resource, initiating sharing of the original copy of the resource in editable form and granting control of an application for editing the original copy of the resource to the owner; and
      when the requestor is not owner of the original copy of the resource,
         determining whether the owner has authorized editing of the original copy of the resource; and
         when it is determined that the owner has authorized editing of the original copy of the resource, initiating sharing of the original copy of the resource in editable form and granting control of the application for editing the original copy of the resource to the owner or, if authorized by the owner, the requestor.

2. The method of claim 1, wherein the recorded location identifies the location of the resource on owner's machine.

3. The method of claim 1 further comprising:
   upon receiving a request to edit an editable form of the resource,
      obtaining authorization to allow editing of the editable form of the resource; and
      initiating the sharing of the resource in the editable form.

4. The method of claim 3, wherein the resource is shared from the owner's machine.

5. The method of claim 3, wherein the authorization to allow editing is obtained from the owner of the original copy of the non-editable copy of the resource.

6. The method of claim 3 further comprising, upon failing to obtain authorization to allow editing, denying the request to edit.

7. The method of claim 3 further comprising granting, a participant of the real-time collaborative session who requested to edit, control of the resource in the editable form.

8. The method of claim 3 further comprising granting the owner of the original copy of the non-editable copy of the resource control of the resource in the editable form.

9. The method of claim 3 further comprising verifying the location of the original copy of the non-editable copy of the resource.

10. The method of claim 9 further comprising, upon failing to verify the location of the original copy of the non-editable copy of the resource, receiving from the owner of the original copy of the non-editable copy of the resource a new location of the original copy of the non-editable copy of the resource.

11. A computer-readable medium containing instructions for controlling a collaboration system to track a non-editable copy of a resource in a real-time collaborative session, by a method comprising:
hosting a meeting between a plurality of meeting participants;
receiving from one of the meeting participants a non-editable copy of a resource for viewing during the meeting;
recording the meeting participant who uploaded the non-editable copy of the resource for viewing during the meeting as an owner of an original copy of the resource;
sharing the non-editable copy of the resource during the real-time collaborative session so that the meeting participants can view but not edit the non-editable copy of the resource as part of the real-time collaborative session; and
upon receiving a request while the non-editable copy of the resource is being shared to edit the resource from the requestor who is a meeting participant other than the owner of the original copy of the resource,
determining whether the owner has authorized the requestor to edit the resource; and
when it is determined that the owner has authorized the requestor to edit the resource, initiating sharing of the original copy of the resource in editable form and granting control of an application for editing the original copy of the resource to the owner or, if authorized by the owner, the requestor.

12. The computer-readable medium of claim 11, wherein the owner of the original copy of the resource is recorded in a resource owner table.

13. The computer-readable medium of claim 11, wherein the recording includes recording an indication of a machine used by the meeting participant to upload the non-editable copy of the resource for viewing during the meeting.

14. The computer-readable medium of claim 11 further comprising:
detecting an attempt by another one of the meeting participants to edit the non-editable copy of the resource;
attempting to obtain authorization to allow the another one of the meeting participants to edit an editable form of the resource; and
upon obtaining the authorization,
causing the resource to be shared in the editable form during the meeting; and
allowing the another one of the meeting participants control of the resource in the editable form for editing.

15. The computer-readable medium of claim 14 further comprising:
upon failing to obtain authorization, not allowing the another one of the meeting participants to edit the editable form of the resource.

16. The computer-readable medium of claim 15 further comprising, upon failing to obtain authorization to allow the another one of the meeting participants to edit, not causing the resource to be shared in an editable form.

17. The computer-readable medium of claim 15 further comprising, upon failing to obtain authorization to allow the another one of the meeting participants to edit, granting the owner of the original copy of the resource control of the resource in the editable form for editing.

18. The computer-readable medium of claim 14 further comprising verifying the location of the original copy of the resource.

19. A collaboration system with a processor and a memory for tracking a non-editable copy of a resource in a real-time collaborative session, the system comprising:
a component configured to provide a collaborative session between participants of the collaborative session;
a component configured to receive the non-editable copy of the resource to be viewed during the collaborative session;
a component configured to record a location of an original copy of the non-editable copy of resource to be viewed during the collaborative session;
a component configured to share the non-editable copy of the resource during the real-time collaborative session so that the participants can view but not edit the non-editable copy of the resource as part of the collaborative session; and
a component configured to, when it is determined that a participant has requested while the non-editable copy of the resource is being shared to edit the resource and that an owner of the resource has authorized the participant to edit the resource, initiating sharing of the original copy of the resource during the collaborative session and allowing the participant to edit the shared original copy of the resource as indicated by the recorded location.

20. The system of claim 19 further comprising a component configured to request authorization to allow editing of the resource upon detecting an attempt to edit the resource during the collaborative session.

* * * * *